United States Patent
Yamaguchi et al.

(10) Patent No.: US 9,379,397 B2
(45) Date of Patent: Jun. 28, 2016

(54) AIR BATTERY

(75) Inventors: Takitaro Yamaguchi, Tsukuba (JP); Takashi Sanada, Tokyo (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 106 days.

(21) Appl. No.: 13/877,183

(22) PCT Filed: Oct. 3, 2011

(86) PCT No.: PCT/JP2011/072796
§ 371 (c)(1),
(2), (4) Date: May 10, 2013

(87) PCT Pub. No.: WO2012/046699
PCT Pub. Date: Apr. 12, 2012

(65) Prior Publication Data
US 2013/0309581 A1    Nov. 21, 2013

(30) Foreign Application Priority Data
Oct. 7, 2010    (JP) ................................ P2010-227402

(51) Int. Cl.
*H01M 8/04*    (2016.01)
*H01M 12/06*    (2006.01)
*H01M 2/40*    (2006.01)

(52) U.S. Cl.
CPC ............ *H01M 8/04276* (2013.01); *H01M 2/40* (2013.01); *H01M 12/06* (2013.01); *H01M 12/065* (2013.01)

(58) Field of Classification Search
USPC ........................................................ 429/403
See application file for complete search history.

(56) References Cited

U.S. PATENT DOCUMENTS 3,849,202 A * 11/1974 Pompon .................... 29/623.2
4,038,458 A    7/1977 Jacquelin
2008/0096061 A1* 4/2008 Burchardt .................... 429/13
(Continued)

FOREIGN PATENT DOCUMENTS

CN    101669248 A    3/2010
JP    S51-15126 A    2/1976
(Continued)

OTHER PUBLICATIONS

Notice of Reasons for Rejection issued Aug. 12, 2014 in counterpart Japanese Patent Application No. P2010-227402 with English translation.
Yasuo Takeda, et al., "Present Status and Issues for Lithium/Air Battery Using Aqueous Electrolyte", GS Yuasa Technical Report, vol. 7, No. 1, Jun. 2010, pp. 1-7.
(Continued)

*Primary Examiner* — Ula C Ruddock
*Assistant Examiner* — Osei Amponsah
(74) *Attorney, Agent, or Firm* — Sughrue Mion, PLLC

(57) ABSTRACT

An air battery having a main body including a container package member, an electrolytic solution contained in the container package member, a cathode having a cathode catalyst that is in contact with the electrolytic solution, and an anode that is in contact with the electrolytic solution; a tank storing the electrolytic solution; a pump circulating the electrolytic solution between the main body and the tank; an oxygen intake incorporating oxygen into the electrolytic solution in the way of circulation of the electrolytic solution; and a pipe arrangement connecting the tank, the pump, the oxygen intake and the main body so that the electrolytic solution circulates in the order thus named, wherein the oxygen intake has an oxygen selective permeable membrane.

7 Claims, 11 Drawing Sheets

(56) References Cited

U.S. PATENT DOCUMENTS

| | | | |
|---|---|---|---|
| 2010/0151336 A1* | 6/2010 | Nakanishi | 429/407 |
| 2010/0190043 A1 | 7/2010 | Nakanishi | |
| 2010/0323249 A1 | 12/2010 | Fujiwara et al. | |
| 2012/0028136 A1* | 2/2012 | Sato et al. | 429/403 |

FOREIGN PATENT DOCUMENTS

| | | |
|---|---|---|
| JP | 51-59343 A | 5/1976 |
| JP | 51-96038 A | 8/1976 |
| JP | 2008-300346 A | 12/2008 |
| JP | 2009-32399 A | 2/2009 |
| JP | 2010-47835 A | 3/2010 |
| JP | 2010-103064 A | 5/2010 |
| JP | 2012-28017 A | 2/2012 |
| WO | 2009/104570 A1 | 8/2009 |
| WO | 2010/104043 A1 | 9/2010 |

OTHER PUBLICATIONS

Hironobu Minowa, et al., "Electrochemical Properties of Carbon Materials and $La_{0.6}Sr_{0.4}Fe_{0.6}Mn_{0.4}O_3$ Electrocatalysts for Air Electrodes of Lithium-air Secondary Batteries", Electrochemistry, vol. 78, No. 5, May 2010, pp. 353-356.

Takeo Yasuda, "Testing Methods and Evaluation Results of Each Dynamic Characteristic of Plastic Materials <5>", Plastics, vol. 51, No. 6, Jun. 2000, pp. 119-127.

Owen Crowther, et al., "Primary Li-air cell development", Journal of Power Sources, vol. 196, 2011, pp. 1493-1502.

First Office Action issued Sep. 28, 2014 in counterpart Chinese Patent Application No. 201180046442.4 with English translation.

Office Action issued May 6, 2015 in counterpart Chinese Patent Application No. 201180046442.4 with translation.

* cited by examiner

Fig.5
(a)
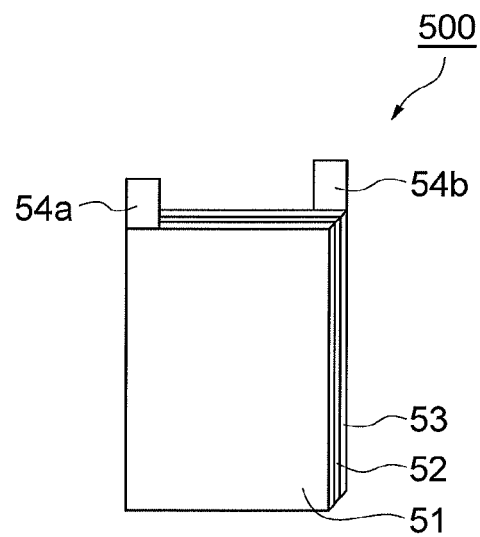
(b)
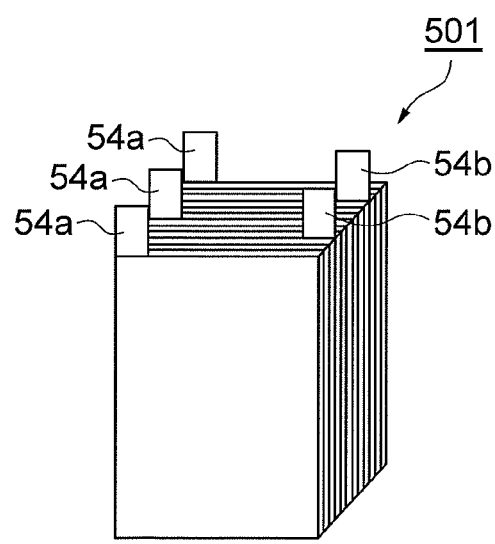

*Fig.10*
(a) 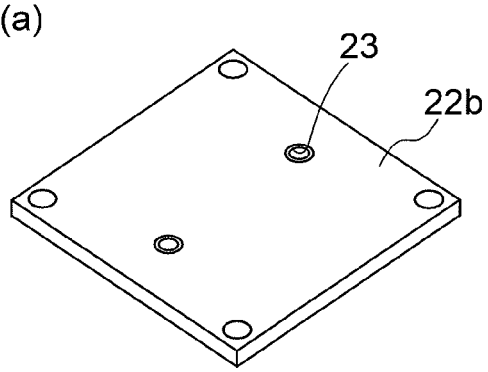
(b) 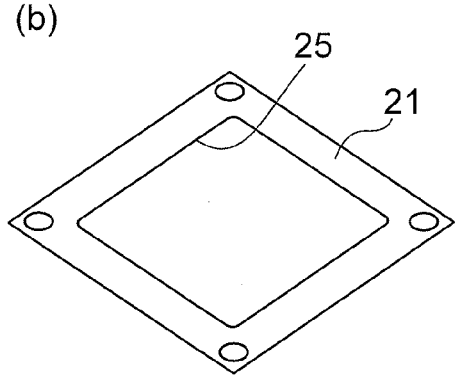
(c) 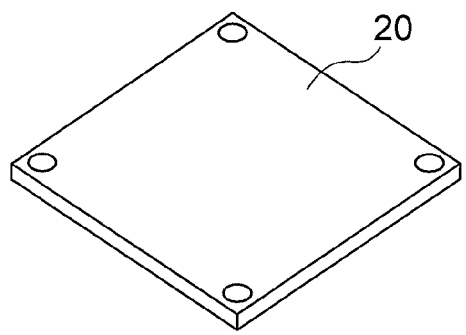
(d) 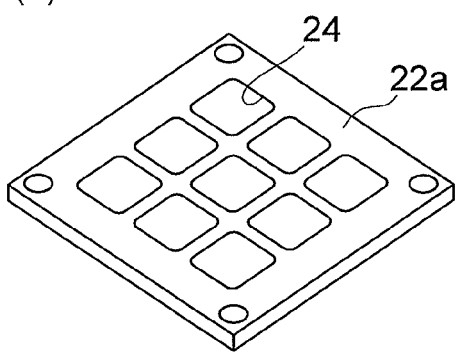

AIR BATTERY

CROSS REFERENCE TO RELATED APPLICATIONS

This application is a National Stage of International Application No. PCT/JP2011/072796 filed Oct. 3, 2011, claiming priority based on Japanese Patent Application No. 2010-227402 filed Oct. 7, 2010, the contents of all of which are incorporated herein by reference in their entirety.

TECHNICAL FIELD

The present invention relates to an air battery and, particularly, relates to an air battery in which an electrolytic solution is allowed to circulate.

BACKGROUND ART

Air battery is a battery using oxygen in the air as a cathode active material. An anode active material in this air battery is generally a metal and generates metal oxides or metal hydroxides through discharge reaction.

In conventional air batteries, oxygen incorporated from outside the battery is reduced to hydroxide ions by a cathode catalyst at a solid/gas interface between the catalyst and air, while an anode metal is oxidized by the hydroxide ions, so that electrochemical reaction progresses.

In Patent Document 1 there is disclosed an air battery comprising: an electrode pair in which a metal with an electrochemically lower potential such as magnesium and aluminum is made an anode and a metal with nobler potential than the anode, or a carbonaceous material, is made a cathode; an electrode connection conducting means; a dissolved oxygen supplying means; and an electrolytic solution comprising a chlorine ion such as sea water and brine. The dissolved oxygen supplying means is, for example, one that supplies air in the electrolytic solution by using a diffuser to expose the electrolytic solution to the air.

CITATION LIST

Patent Literature

Patent Document 1: JP2010-47835A

SUMMARY OF INVENTION

Technical Problem

However, in an electrolytic solution such as sea water and brine, sufficient electromotive force cannot be obtained, as compared with a strongly alkaline electrolytic solution. On the other hand, if a strongly alkaline electrolytic solution is used in Patent Document 1, it will be thought that carbon dioxide in the air has dissolved in the electrolytic solution unlimitedly and the battery is poisoned.

One example of the poisoning is illustrated in the following. In the case where an aqueous solution of potassium hydroxide (KOH) is used as an electrolytic solution, carbon dioxide in the air reacts with KOH as the electrolyte in the electrolytic solution and potassium hydrogencarbonate ($KHCO_3$) or potassium carbonate ($K_2CO_3$) is generated. Thereby, the ionic conductivity of the electrolytic solution lowers and the battery performance lowers. Also, the potassium hydrogencarbonate ($KHCO_3$) or potassium carbonate ($K_2CO_3$) precipitates on the surface of a cathode catalyst to suppress the reductive reaction of oxygen, and the battery performance lowers.

The present invention has been achieved in consideration of the above-mentioned technical problem and has an object to provide an air battery that is unsusceptible to poisoning by carbon dioxide in the air.

Solution to Problem

Specifically, an air battery of the present invention comprises: a main body including a container package member, an electrolytic solution contained in the container package member, a cathode having a cathode catalyst that is in contact with the electrolytic solution, and an anode that is in contact with the electrolytic solution; a tank storing the electrolytic solution; a pump circulating the electrolytic solution between the main body and the tank; an oxygen intake incorporating oxygen into the electrolytic solution in the way of circulation of the electrolytic solution; and a pipe arrangement connecting the tank, the pump, the oxygen intake and the main body so that the electrolytic solution circulates in the order thus named, wherein the oxygen intake has an oxygen selective permeable membrane.

Since the oxygen intake comprises the oxygen selective permeable membrane that is excellent both in oxygen permeability and in selectivity for oxygen permeation relative to carbon dioxide permeation (which may be hereafter referred to as "oxygen/carbon dioxide permselectivity"), the air battery of the present invention can efficiently remove carbon dioxide in the air and can suppress the reaction between the electrolyte in the electrolytic solution and carbon dioxide. Thereby, the reduction in battery performance by the poisoning of the cathode catalyst, or the like, can be suppressed securely.

Here, a contact angle of the electrolytic solution against a surface of the oxygen selective permeable membrane can be set at 90° or greater. Thereby, pores in the oxygen selective permeable membrane through which oxygen diffuses hardly become wet with the electrolytic solution and liquid leakage from the oxygen selective permeable membrane can be reduced. The clogging of the pores can also be suppressed.

A contact angle of the electrolytic solution against a surface of the oxygen selective permeable membrane can also be set at 150° or greater. Thereby, the pores in the oxygen selective permeable membrane hardly become wet with the electrolytic solution more and the liquid leakage from the oxygen selective permeable membrane can be reduced more. The clogging of the pores can also be suppressed more.

Further, an oxygen permeability coefficient ($P_{O2}$) of the oxygen selective permeable membrane may be $400 \times 10^{-10}$ $cm^3 \cdot cm/cm^2 \cdot s \cdot cm$ Hg or greater. Thereby, oxygen in the air can be efficiently supplied to the cathode catalyst.

Still further, a ratio ($P_{O2}/P_{CO2}$) of the oxygen permeability coefficient ($P_{O2}$) to the carbon dioxide permeability coefficient ($P_{CO2}$) for the oxygen selective permeable membrane may be 0.15 or greater. Thereby, the effect of removing carbon dioxide can be obtained sufficiently.

In addition, when the anode is at least one metal selected from the group consisting of lithium, sodium, magnesium, aluminum, potassium, calcium, zinc, iron and a hydrogen-absorbing alloy, the air battery can easily produce a sufficient discharge capacity.

When the electrolytic solution is a solution comprising an electrolyte and water and the electrolyte is at least one kind selected from the group consisting of KOH, NaOH, LiOH, Ba(OH)$_2$ and Mg(OH)$_2$, the air battery can easily produce a larger discharge capacity.

Further, the cathode catalyst may comprise manganese dioxide or platinum. Thereby, a large discharge capacity can be obtained from the air battery.

In addition, the cathode catalyst may comprise a perovskite-type mixed oxide represented by ABO$_3$. In this instance, the ABO$_3$ may comprise at least two atoms selected from the group consisting of La, Sr and Ca at the A site, and at least one atom selected from the group consisting of Mn, Fe, Cr and Co at the B site. In the case where the cathode catalyst comprises the perovskite-type mixed oxide represented by ABO$_3$, the air battery can be conveniently used as a secondary air battery because the mixed oxide has the absorption/desorption capability of oxygen.

Advantageous Effects of Invention

According to the present invention, it is possible to provide an air battery that is unsusceptible to poisoning by carbon dioxide in the air.

BRIEF DESCRIPTION OF DRAWINGS

FIG. 3(a) is a perspective view of a main body at a first principal plane side; and FIG. 3(b) is a perspective view of the main body at a second principal plane side.

FIG. 5 is a schematic view of a structure comprised of a cathode, a separator and an anode in an embodiment of the air battery according to the present invention: FIG. 5(a) is a perspective view illustrating a monolayer structure; and FIG. 5(b) is a perspective view illustrating a laminated structure.

FIG. 6(a) is a schematic view illustrating a step of immersing the structure comprised of a cathode, a separator and an anode into an electrolytic solution; FIG. 6(b) is a schematic view illustrating a step of accommodating the structure in a container package member; and FIG. 6(c) is a schematic view illustrating a step of sealing the container package member.

FIG. 10 is a schematic view of members that constitute an oxygen intake in an Example.

DESCRIPTION OF EMBODIMENTS

Figure 1:
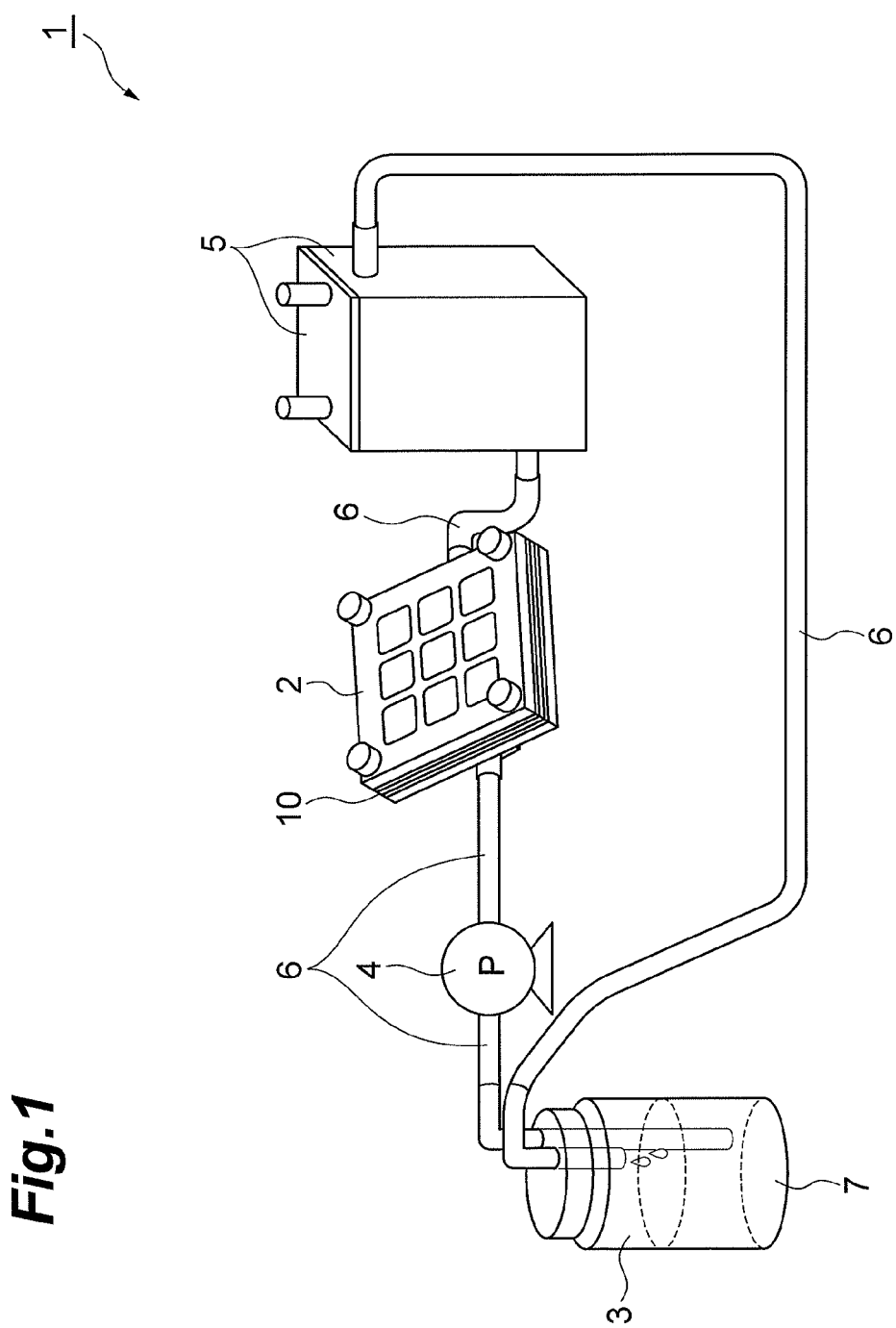
FIG. 1 is a schematic view illustrating an embodiment of an air battery according to the present invention.

Hereafter, preferred embodiments of an air battery according to the present invention will be specifically described with reference to the drawings. In the description of the drawings, the same symbols are designated to the identical or corresponding elements and duplicated descriptions will be omitted. Actual dimensional ratios may differ from dimensional ratios in the drawings.

FIG. 1 is a schematic view illustrating an embodiment of an air battery according to the present invention. As illustrated in FIG. 1, the air battery 1 according to the present embodiment comprises a main body 5, a tank 3 in which an electrolytic solution 7 is stored, a pump 4 circulating the electrolytic solution 7 between the main body 5 and the tank 3, and an oxygen intake 2 incorporating oxygen into the electrolytic solution 7 in the way of circulation of the electrolytic solution 7. The main body 5, the oxygen intake 2, the pump 4 and the tank 3 are connected by a pipe arrangement 6 in this order. The pipe arrangement 6 also connects these so that the electrolytic solution 7 circulates through the tank 3, the pump 4, the oxygen intake 2 and the main body 5 in the order thus named. The oxygen intake 2 comprises an oxygen selective permeable membrane 10.

[Oxygen Intake]

Figure 2:
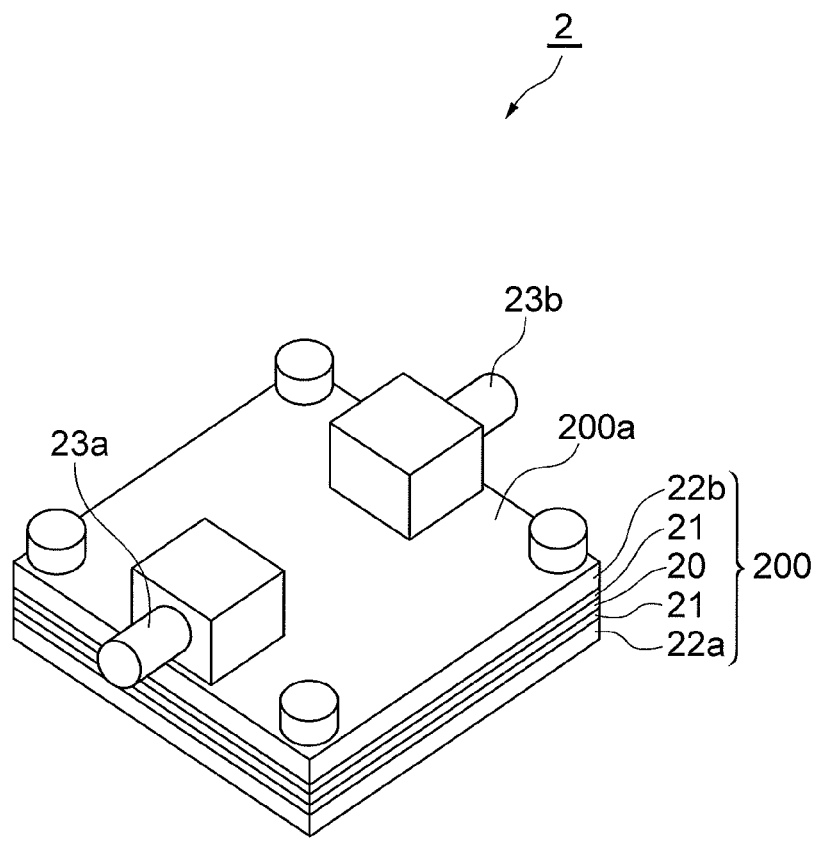
FIG. 2 is a schematic view illustrating an oxygen intake in an embodiment of the air battery according to the present invention.
Figure 3:
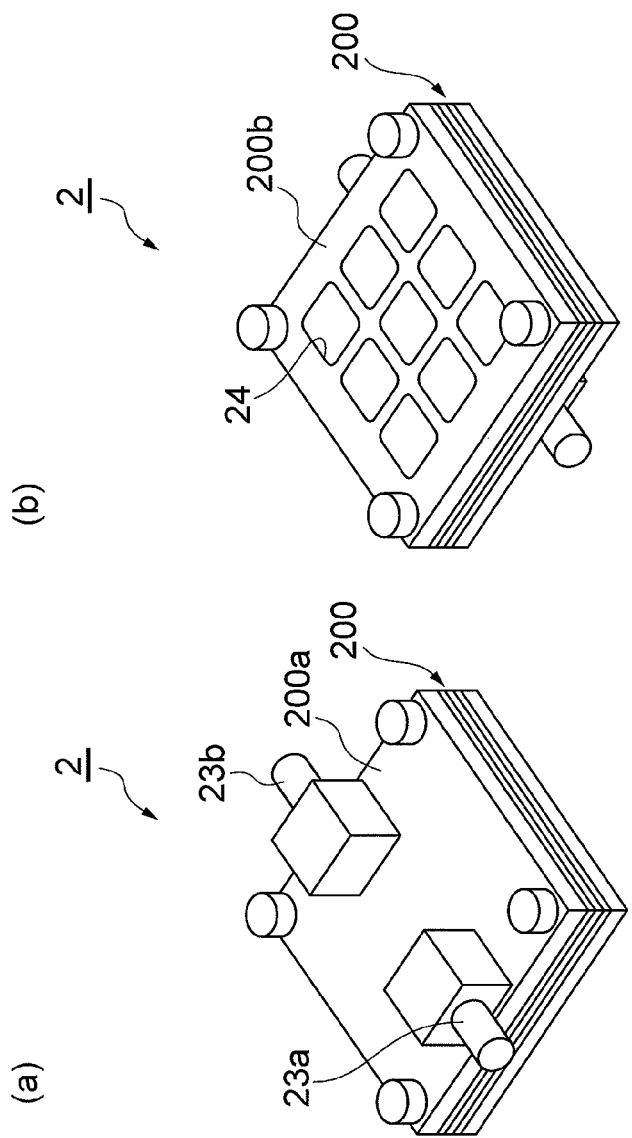
FIG. 3 is a schematic view illustrating the oxygen intake in an embodiment of the air battery according to the present invention.

FIGS. 2 and 3 are schematic views illustrating the oxygen intake 2 in the air battery according to the present embodiment. FIG. 3(a) is a perspective view schematically illustrating a structure at the lower side of the oxygen intake 2 in the air battery according to the present embodiment. FIG. 3(b) is a perspective view schematically illustrating a structure at the upper side of the oxygen intake 2 in the air battery according to the present embodiment.

As illustrated in FIG. 2, the oxygen intake 2 includes a main body part 200 and nozzles 23a, 23b that supply or drain the electrolytic solution 7 inside the main body part 200. As illustrated in FIGS. 2 and 3, the main body part 200 has an inlet nozzle 23a and an outlet nozzle 23b for the electrolytic solution 7 on a first principal plane 200a. A plurality of through-holes 24 incorporating air into the inside of the oxygen intake 2 are also formed on a second principal plane 200b of the main body part 200. Atmospheric air is introduced into the inside of the main body part 200 by passing through these many through-holes.

Figure 4:
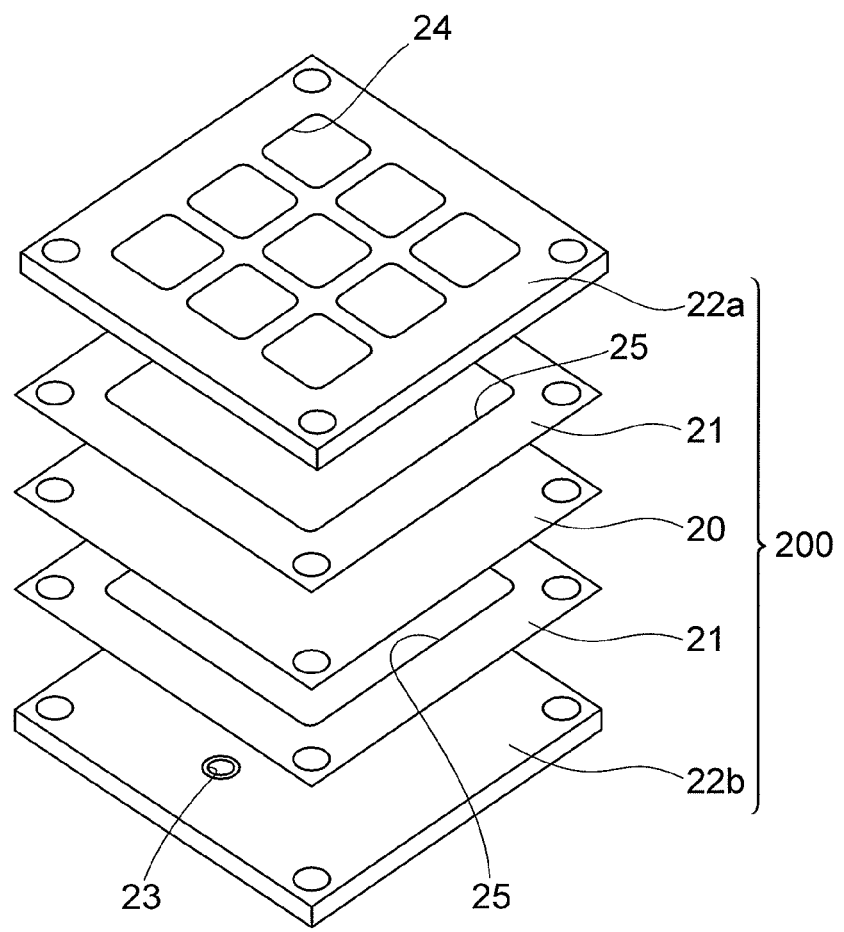
FIG. 4 is an exploded view of the oxygen intake in an embodiment of the air battery according to the present invention.

FIG. 4 is an exploded view of the main body part 200 of the oxygen intake 2 in the air battery according to the present embodiment. The main body part 200 comprises: an oxygen selective permeable membrane 20; a pair of elastic plates 21 having openings 25 that are disposed so as to sandwich the oxygen selective permeable membrane 20; and a pair of stainless plates 22a, 22b that are disposed so as to sandwich a laminate comprising the elastic plate 21, the oxygen selective permeable membrane 20 and the elastic plate 21. Specifically, the main body part 200 has a laminate structure such that the stainless plate 22a, the elastic plate 21, the oxygen selective permeable membrane 20, the elastic plate 21 and the stainless plate 22b are laminated sequentially.

Two through-holes 23, which conform to the inlet nozzle 23a and the outlet nozzle 23b for the electrolytic solution 7, are formed in the stainless plate 22b. A number of through-holes 24 are formed in the stainless plate 22a. The air that has passed the through-holes 24 of the stainless plate 22a passes through the opening 25 of the elastic plate 21 and the oxygen selective permeable membrane 20 sequentially, to come into contact with the electrolytic solution 7 supplied from the inlet nozzle 23a.

The oxygen selective permeable membrane 20 is excellent in the efficiency of oxygen permeation among the air components and its efficiency of oxygen permeation is extremely high relative to its efficiency of carbon dioxide permeation. Therefore, air with a lower concentration of carbon dioxide than that in the atmospheric air can be dissolved in the electrolytic solution 7, and carbon dioxide to be dissolved in the electrolytic solution 7 can be drastically suppressed. Consequently, the effect of the main body 5 being unsusceptible to poisoning by carbon dioxide can be obtained. In this way, the present invention will make it possible to solve the technical problem in the conventional air batteries and is very useful for industrial purposes.

Here, it is desirable that the contact angle of the electrolytic solution 7 against the surface of the oxygen selective permeable membrane 20 be 90° or greater. By setting the contact angle to be 90° or greater, pores in the oxygen selective permeable membrane 20 through which oxygen diffuses hardly become wet with the electrolytic solution, and liquid leakage from the oxygen selective permeable membrane 20 can be reduced. The clogging of the pores can also be suppressed. Examples of the oxygen selective permeable membrane 20 having a contact angel of 90° or greater include commercially available silicone membranes. In addition, the electrolytic solution 7 can contain dissolved oxygen within the air battery.

Further, from the standpoint of preventing the liquid leakage from the oxygen intake 2, it is preferable that the contact angle be 150° or greater. By setting the contact angle to be 150° or greater, pores of the oxygen selective permeable membrane 20 hardly become wet with the electrolytic solution more, and the liquid leakage from the oxygen selective permeable membrane 20 can be reduced more. The clogging of the pores can also be suppressed more.

Here, the "contact angle" means an angle (an angle inside liquid is taken) formed by the oxygen selective permeable membrane 20 and an tangential line on a surface of a liquid droplet of the electrolytic solution 7 at a point where the three phases of the liquid droplet of the electrolytic solution 7, the oxygen selective permeable membrane 20 and air come into contact. The contact angle can be determined by the θ/2 method, which is a general method. The θ/2 method is a method for calculating a contact angle θ as a two-fold value of $\theta_1$ in the case where the value of an angle defined between a straight line connecting the right or left end point and the vertex point of a liquid droplet of an electrolytic solution on an oxygen selective permeable membrane, and the oxygen selective permeable membrane is $\theta_1$. As a device measuring the contact angle, there is mentioned DM500 manufactured by Kyowa Interface Science Co. Ltd. An electrolytic solution and an oxygen selective permeable membrane are placed for approximately 6 hours in a room with constant temperature and humidity where the temperature is controlled at from 20 to 26° C. and the relative humidity is controlled at from 30 to 70%; the measurement of a contact angle as mentioned above may be carried out on a liquid droplet that is obtained by dropping one drop of the electrolytic solution on the surface of the oxygen selective permeable membrane with a microsyringe.

As the oxygen selective permeable membrane 20 described above, there are mentioned polymer membranes of alkyne having one or more aromatic groups in addition to silicone membranes. Use of such membranes allows carbon dioxide to be selectively removed from the air. The aromatic group contained in the polymer membrane of alkyne having one or more aromatic groups is preferably a group selected from the group consisting of a phenyl group, a substituted phenyl group, a naphthalyl group, an anthracenyl group, a pyrenyl group, a perylenyl group, a pyridinyl group, a pyrroyl group, a thiopheneyl group and a furyl group, or a substituted aromatic group in which at least a part of hydrogen atoms in the group is substituted. When the aromatic group is any one of the above-mentioned groups, the oxygen/carbon dioxide permselectivity improves more. In addition, the aromatic group is more preferably a phenyl group or a substituted phenyl group.

It is preferable that the oxygen permeability coefficient ($P_{O2}$) of the oxygen selective permeable membrane 20 be $400 \times 10^{-10}$ cm³·cm/cm²·s·cm Hg(=400 Barrer) or greater. When the oxygen permeability coefficient ($P_{O2}$) is $400 \times 10^{-10}$ cm³·cm/cm²·s·cm Hg or greater, the oxygen permeation of the oxygen selective permeable membrane 20 thereby proceeds smoothly. Examples of such oxygen selective permeable membrane include commercially available silicone membranes.

The oxygen permeability coefficient ($P_{O2}$) of the oxygen selective permeable membrane 20 is a value measured at 23° C. and 60% humidity by using an oxygen/nitrogen=10 v/40 v % gas with a gas permeability measuring device (GTR-30X manufactured by GTR Tec Corporation).

The ratio ($P_{O2}/P_{CO2}$) of oxygen permeability coefficient ($P_{O2}$) to carbon dioxide permeability coefficient ($P_{CO2}$) for the oxygen selective permeable membrane is preferably 0.15 or greater. By setting $P_{O2}/P_{CO2}$ to be 0.15 or greater, it is possible to preferably suppress the permeation of carbon dioxide. Examples of such oxygen selective permeable membrane include commercially available silicone membranes.

The carbon dioxide permeability coefficient ($P_{CO2}$) of the oxygen selective permeable membrane 20 is also a value measured at 23° C. and 60% humidity by using a gas of pure carbon dioxide with a gas permeability measuring device (GTR-30X manufactured by GTR Tec Corporation).

When carbon dioxide is selectively removed from the air, it can, for example, prevent KOH as an electrolyte in the electrolytic solution from reacting with carbon dioxide to generate potassium hydrogen carbonate ($KHCO_3$) or potassium carbonate ($K_2CO_3$). Thereby, lowering in battery performance can be suppressed.

When carbon dioxide is selectively removed from the air, it can also prevent potassium hydrogen carbonate ($KHCO_3$) or potassium carbonate ($K_2CO_3$) from precipitating on the surface of a cathode catalyst. Thereby, lowering in battery performance can be suppressed.

[Main Body]

The main body 5 includes a container package member, an electrolytic solution 7 contained in the container package member, a cathode having a cathode catalyst that is in contact with the electrolytic solution 7, and an anode that is in contact with the electrolytic solution. FIG. 5 is a schematic view illustrating a structure comprised of a cathode 51, a separator 52 and an anode 53 in the air battery according to the present embodiment. FIG. 5(a) is a schematic view illustrating a structure 500 in which the cathode 51, the separator 52 and the anode 53 are laminated in this order. FIG. 5(b) illustrates a structure 501 in which a plurality of the structures 500 are laminated (which may be hereafter referred to as "an electrode group 501").

In the case where the structure 500 in which the cathode 51, the separator 52, and the anode 53, as illustrated in FIG. 5(a), are laminated in this order is made one set, a battery of laminated type can be prepared by simply laminating a plurality of the sets through separators. As illustrated in FIG. 5(b), the structure 500 is also used as one set, and the structure 500 and a set (a structure 500) that is adjacent thereto are laminated so that the respective anodes and the respective cathodes come into contact with each other, thereby being able to prepare a battery of laminated type that requires no separator between the structures 500.

Figure 6:
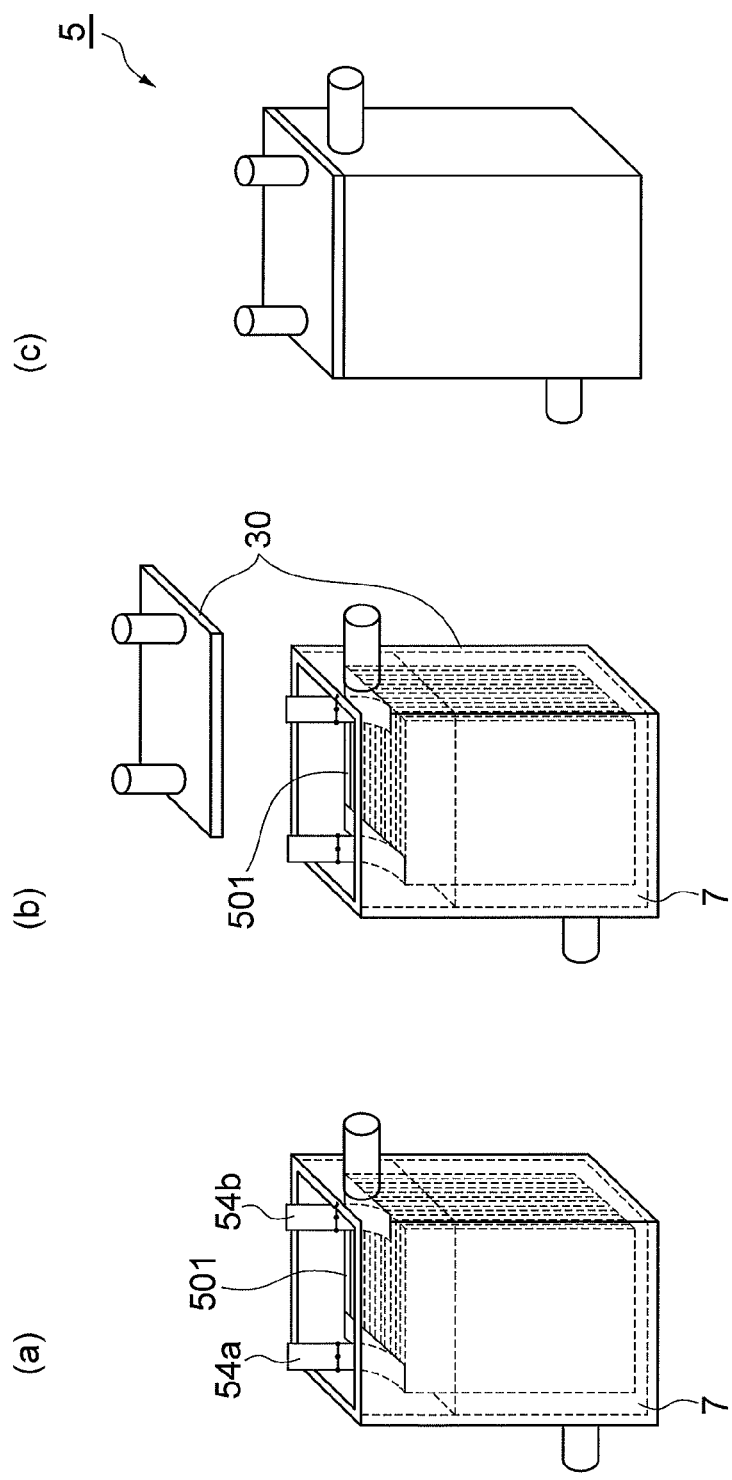
FIG. 6 is a schematic view illustrating a method for producing a main body in an embodiment of the air battery according to the present invention.

FIG. 6 is a schematic view illustrating a method for producing the main body 5. FIG. 6(a) is a schematic view illustrating a step of immersing the structure 501 comprised of the cathode 51, the separator 52 and the anode 53 into the electrolytic solution 7. FIG. 6(b) is a schematic view illustrating a step of accommodating the structure 501 in a container package member 30. FIG. 6(c) is a schematic view illustrating a step of sealing the container package member 30.

The container package member 30 is, for example, made of a resin such as polystyrene, polyethylene, polypropyrene, polyvinyl chloride and ABS, or is made of a metal that does not react with any of the anode, the cathode and the electrolytic solution.

The cathode 51 is comprised of a cathode collector and a cathode catalyst layer comprising a cathode catalyst. It is sufficient that the cathode collector be a conductive material, and examples thereof include at least one metal selected from the group consisting of nickel, chromium, iron and titanium with nickel or stainless being preferable. The shape is a metal flat plate, a mesh, a porous plate or the like. Preferably, selection is made from the mesh or the porous plate.

It is preferable that the cathode catalyst layer comprise, in addition to the cathode catalyst, a conductive agent and a binder adhering these to the cathode collector. It is sufficient that one preferable embodiment of the cathode catalyst be a material capable of reducing oxygen, which includes a manganese oxide or platinum. In the case where the manganese oxide is used, manganese dioxide is desirable. Particularly, since platinum has the absorption/desorption capability of oxygen, the air battery can be easily used as a secondary air battery. The cathode catalyst also comprises a perovskite-type mixed oxide represented by $ABO_3$, and the $ABO_3$ comprises at least two atoms selected from the group consisting of La, Sr and Ca at the A site, and the $ABO_3$ may comprise at least one atom selected from the group consisting of Mn, Fe, Cr and Co at the B site.

Moreover, other one preferable embodiment of the cathode catalyst may be an oxide comprising one or more metals selected from the group consisting of iridium, titanium, tantalum, niobium, tungsten and zirconium.

As the conductive agent, there are mentioned carbonaceous materials such as acetylene black and Ketjen Black.

It is sufficient that the binder be one which does not dissolve in an electrolytic solution to be used; and preferable ones are fluororesins such as polytetrafluoroethylene (PTFE), tetrafluoroethylene-perfluoroalkyl vinyl ether copolymers, tetrafluoroethylene-hexafluoropropylene copolymers, tetrafluoroethylene-ethylene copolymers, polyvinylidene fluoride, polychlorotrifluoroethylene and chlorotrifluoroethylene-ethylene copolymers.

The anode 53 includes at least one metal selected from the group consisting of lithium, sodium, magnesium, aluminum, potassium, calcium, zinc, iron and a hydrogen-absorbing alloy. Among these, aluminum is preferable and aluminum with a purity of 99.8% or higher is more preferable.

Also, by using an electrode capable of charging and discharging as the anode 53, it is possible to prepare a laminated battery capable of charging and discharging. Examples of the anode capable of charging and discharging include hydrogen-absorbing alloys. In the case of the hydrogen-absorbing alloy, it generates water through discharge reaction.

In the case where the anode capable of charging and discharging, such as a hydrogen-absorbing alloy, is used as the anode 53, it is preferable that a cathode for charge be provided separately from the cathode 51. Since the cathode 51 is not used as a cathode for charge, the cathode catalyst will be for use only in discharging. Specifically, the cathode catalyst can be prevented from being oxidized by oxygen generated at the cathode during charging, and the degradation of the cathode catalyst during charging can be suppressed.

It is sufficient that the cathode for charge be a conductive material, and examples thereof include at least one metal selected from the group consisting of nickel, chromium, iron and titanium with nickel or stainless being preferable. The shape is a mesh, a porous plate or the like.

It is preferable that lead wires 24a, 24b for current draw be connected to the cathode 51 and the anode 53, respectively. The lead wire 24b is connected to the anode 53, thereby allowing the discharge current to be efficiently drawn from the anode 53; the lead wires 24a, 24b for current draw are respectively connected to the cathode 51 and the anode 53, thereby making the charge and discharge to be possible, and the air battery can be used as a secondary battery.

A separator 52 may be present between the cathode 51 and the anode 53. As the separator 52, it is possible to use an insulating material that allows the movement of an electrolyte and that is, for example, a nonwoven cloth or a porous membrane made of a resin such as polyolefin and fluororesin. Specific resins include polyethylene, polypropylene, polytetrafluoroethylene and polyvinylidene fluoride. Particularly, in the case where the electrolyte is an aqueous solution, the resins include polyethylene, polypropylene, polytetrafluoroethylene, polyvinylidene fluoride and the like, which are hydrophilized.

The electrolytic solution comprises at least a solvent and an electrolyte and is at least in contact with the cathode catalyst and the anode. The solvent comprises an aqueous solvent and/or a non-aqueous solvent. Water is normally used as the aqueous solvent.

In the case where the aqueous solvent is used, the electrolyte comprises one or more hydroxides selected from the group consisting of potassium, sodium, lithium, barium and magnesium (KOH, NaOH, LiOH, $Ba(OH)_2$ and $Mg(OH)_2$).

The concentration of the electrolyte contained in the aqueous solvent is preferably from 1 to 99% by weight (wt %), more preferably from 5 to 60 wt %, and still more preferably from 5 to 40 wt %.

The non-aqueous solvent comprises one or more solvent selected from the group consisting of cyclic carbonates, chain carbonates, cyclic esters, cyclic ethers and chain ethers.

Here, as the cyclic carbonate, there are mentioned ethylene carbonate, propylene carbonate, butylene carbonate, vinylene carbonate and the like. As the chain carbonate, there are mentioned dimethyl carbonate, diethyl carbonate, methyl ethyl carbonate and the like. As the cyclic ester, there are mentioned γ-butyrolactone, γ-valerolactone and the like. As the cyclic ether, there are mentioned tetrahydrofuran, 2-methyltetrahydrofuran and the like. As the chain ether, there are mentioned dimethoxyethane, ethylene glycol dimethyl ether and the like.

In the case where the non-aqueous solvent is used, it is preferable that a salt comprising an element which constitutes an anode active material be contained as the electrolyte.

In the case where the anode used in the present invention is lithium or sodium, examples of the electrolyte include salts comprising lithium ions and/or sodium ions and $ClO_4^-$, $PF_6^-$, $AsF_6^-$, $SbF_6^-$, $BF_4^-$, $CF_3SO_3^-$, $N(SO_2CF_3)_2^-$, $N(SO_2C_2F_5)_2^-$, $N(SO_2CF_3)(COCF_3)^-$, $(C_4F_9SO_3)^-$, $C(SO_2CF_3)_3^-$, $B_{10}Cl_{10}^{2-}$, $BOB^-$ (wherein BOB represents bis(oxalato)borate), an anion of lower fatty carboxylic acid, or $AlCl_4^-$. A mixture of two or more of these may be used.

Among these, it is usually preferable that at least one kind, which contains fluorine, selected from the group consisting of $LiPF_6$, $LiAsF_6$, $LiSbF_6$, $LiBF_4$, $LiCF_3SO_3$, $LiN(SO_2CF_3)_2$ and $LiC(SO_2CF_3)_3$ be used as the lithium salt.

Among these, it is usually preferable that at least one kind, which contains fluorine, selected from the group consisting of $NaPF_6$, $NaAsF_6$, $NaSbF_6$, $NaBF_4$, $NaCF_3SO_3$, $NaN(SO_2CF_3)_2$ and $NaC(SO_2CF_3)_3$ be used as the sodium salt.

The concentration of the electrolyte in the non-aqueous solvent is preferably from 1 to 99% by weight (wt %), more preferably from 5 to 60 wt %, and still more from preferably 5 to 40 wt %.

(Tank Storing Electrolytic Solution)

The tank 3 storing the electrolytic solution 7 is, for example, made of a resin such as polystyrene, polyethylene, polypropylene, polyvinyl chloride and ABS, or is made of a metal that does not react with the electrolytic solution 7.

(Pump Circulating Electrolytic Solution)

It is sufficient that the pump 4 circulating the electrolytic solution 7 be made of a material that does not react with the electrolytic solution 7 at the site to be contacted by the electrolytic solution 7 and be one which delivers the electrolytic solution 7 in a quantitatively controlled manner. Selection is made, for example, from reciprocating pumps such as a piston pump, a plunger pump and a diaphragm pump, and rotary pumps such as a gear pump, a vane pump and a screw pump.

(Pipe Arrangement)

The pipe arrangement 6 connects the main body 5, the oxygen intake 2, the pump 4 circulating the electrolytic solution 7 and the tank 3 storing the electrolytic solution in this order. The pipe arrangement 6 also connects these so that the electrolytic solution 7 circulates through the tank 3, the pump 4, the oxygen intake 2 and the main body 5 in the order thus named. The pipe arrangement 6 is, for example, made of a resin such as polystyrene, polyethylene, polypropylene, polyvinyl chloride and ABS, or is made of a metal that does not react with the electrolytic solution.

Figure 8:
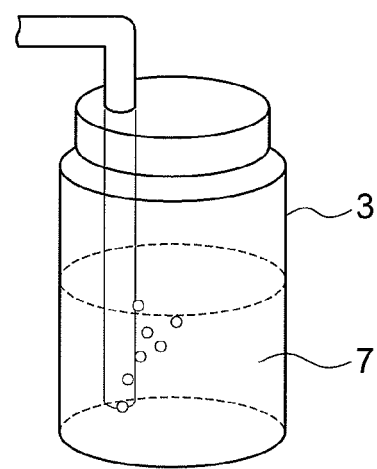
FIG. 8 is a schematic view illustrating a method for dissolving gas in an electrolytic solution within a tank in a Comparative Example.

The method for dissolving a gas in the electrolytic solution can dissolve oxygen in the electrolytic solution 7 by infusing the electrolytic solution 7 into the tank 3 storing the electrolytic solution and bubbling the gas, such as air, in the electrolytic solution 7 with a diffuser, as is illustrated in FIG. 8.

Figure 9:
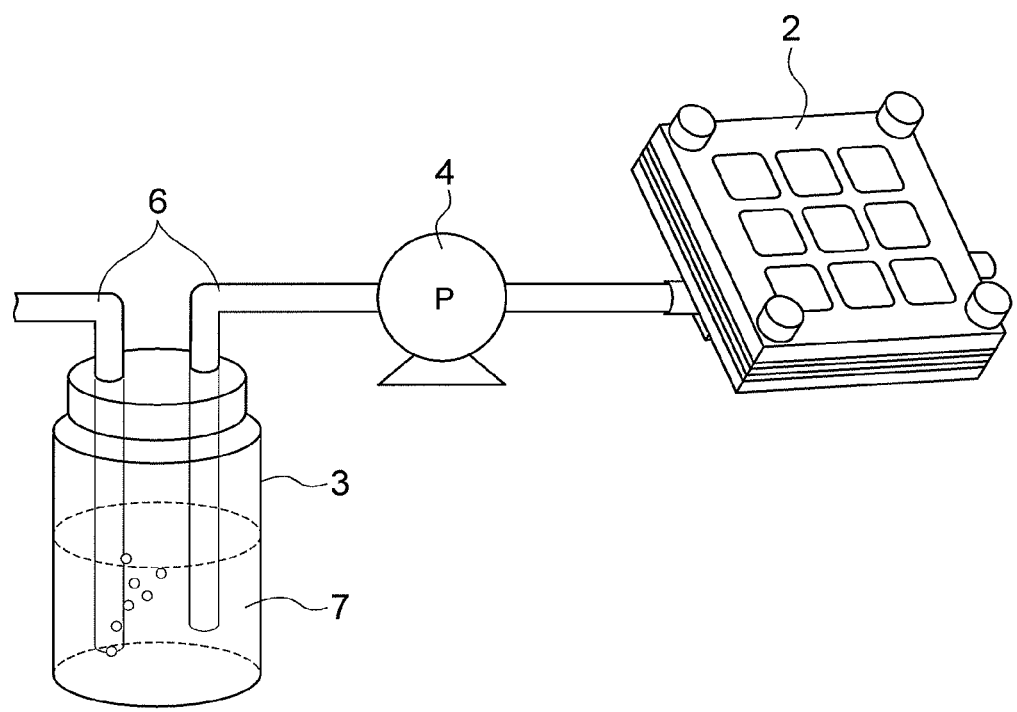
FIG. 9 is a schematic view illustrating a method for dissolving oxygen in an electrolytic solution within a tank in an Example.

Another method for dissolving oxygen in the electrolytic solution 7 removes oxygen by bubbling a nitrogen gas in the electrolytic solution 7 with a diffuser and dissolving nitrogen in the electrolytic solution 7, as is illustrated in FIG. 9. Also, it is possible to incorporate oxygen into the electrolytic solution 7 by disposing the oxygen intake 2 between the tank 3 accommodating the electrolytic solution and the main body 5.

As described above, the preferred embodiments of the air battery according to the present invention have been explained; however, the present invention will not be limited to the above-mentioned embodiments as far as effects of the present invention are obtained.

EXAMPLES (Preparation of Electrolytic Solution)

An electrolyte was prepared by the method described below. Potassium hydroxide and purified water were mixed to give a 1.0 M KOH aqueous solution and an electrolytic solution was prepared.

(Tank Storing Electrolytic Solution)

Figure 7:
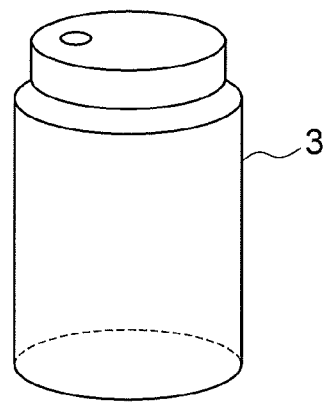
FIG. 7 is a schematic view illustrating a tank storing an electrolytic solution in an embodiment of the air battery according to the present invention.

A container made of polypropylene with a volume of 200 ml, as illustrated in FIG. 7, was used as a tank 3 storing the electrolytic solution.

(Method 1 for Dissolving Gas)

The tank 3 storing the electrolytic solution, which is illustrated in FIG. 7, was used to dissolve gas in the electrolytic solution 7. The electrolytic solution 7 was infused into the tank 3, and as illustrated in FIG. 8, oxygen was dissolved in the electrolytic solution 7 by bubbling air in the electrolytic solution 7 with a diffuser.

(Method 2 for Dissolving Gas)

As another method for dissolving oxygen in the electrolytic solution 7, oxygen was first removed by bubbling a nitrogen gas in the electrolytic solution 7 with a diffuser to dissolve nitrogen in the electrolytic solution 7, as is illustrated in FIG. 9. Also, the oxygen intake 2 was disposed between the tank 3 accommodating the electrolytic solution and the main body 5, thereby incorporating oxygen into the electrolytic solution 7.

(Oxygen Intake)

The oxygen intake 2, as illustrated in FIGS. 2 to 4 described above, was used as an oxygen incorporating device for dissolving oxygen in the electrolytic solution 7. FIG. 10 is a perspective view of members that constitute the oxygen intake 2 which was used in the present Example.

FIG. 10(a) is a perspective view of a stainless plate 22b of 250 mm long×250 mm wide (which may be hereafter referred to as SUS plate). FIG. 10(b) is a perspective view of a rubber plate 21 which is a rubber plate having a size of 250 mm long×250 mm wide with an opening 25 of 200 mm long×200 mm wide having been made. FIG. 10(c) is a perspective view of the oxygen selective permeable membrane 20 of 250 mm long×250 mm wide. FIG. 10(d) is a perspective view of a porous stainless plate 22a of 250 mm long×250 mm wide.

The stainless plate 22b illustrated in FIG. 10(a), the rubber plate 21 illustrated in FIG. 10(b), the oxygen selective membrane 20 illustrated in FIG. 10(c) and the porous stainless plate 22a illustrated in FIG. 10(d) were laminated in this order, as is illustrated in FIG. 4. After this was pressure fixed with bolts and nuts, nozzles were installed to inlet/outlet ports for the electrolytic solution (FIG. 2).

As the oxygen selective permeable membrane 20, there was used a silicone membrane (0.1 mm thick; manufactured by AS ONE Corporation; product name of silicone film) having a contact angel of 105° against the above-mentioned electrolytic solution (1M KOH aqueous solution). The oxygen permeability coefficient ($P_{O2}$) of this silicone membrane was $620×10^{-10}$ $cm^3·cm/cm^2·s·cm$ Hg and its oxygen/carbon dioxide permselectivity ($P_{O2}/P_{CO2}$) was 0.20.

(Measurement of Amount of Dissolved Oxygen)

A dissolved oxygen analyzer of the Galvani type was used as a device for quantifying dissolved oxygen of the electrolytic solution 7. All measurement was conducted at 23° C.

(Identification 1 of Amount of Dissolved Oxygen)

To the electrolytic solution tank was added 70 ml of a 1M KOH aqueous solution. After a nitrogen gas with a purity of 99.9% was bubbled for 30 minutes, the dissolved oxygen was measured with the dissolved oxygen analyzer of the Galvani type. As a result, the amount of dissolved oxygen was 0.00 mg/L (below the measurable limit).

(Identification 2 of Amount of Dissolved Oxygen)

Except that the nitrogen gas was replaced by air, "Identification 1 of Amount of Dissolved Oxygen" was similarly conducted. As a result, the amount of dissolved oxygen was 7 mg/L.

(Confirmation of Mechanism of Oxygen Intake)

The 1M KOH aqueous solution with 0.00 mg/L of dissolved oxygen in the section of Identification 1 of Amount of Dissolved Oxygen was allowed to pass through the oxygen intake 2 at a flow rate of 0.5 g/min with a pump. When the amount of dissolved oxygen was measured then, it was 6 mg/L. As the pipe arrangement 6 for connecting the tank 3 for storing the electrolytic solution, the pump 4 and the oxygen intake 2, there was used one made of polypropylene.

(Fabrication of Air Battery)
(Fabrication of Anode)

An aluminum foil with a thickness of 0.1 mm (A1085 manufactured by Nippon Foil Mfg. Co., Ltd.; 99.85% purity) was cut into 35 mm long×25 mm wide. To this aluminum foil there was attached an aluminum lead wire (99.5% purity) of 50 mm long×3 mm wide (0.20 mm thick) by using a resistance welder. Next, 5 mm of an aluminum lead wire extended from the resistant-welded section and one side of aluminum (35 mm long×25 mm wide) were masked with an imide tape to fabricate the aluminum anode.

(Fabrication of Separator)

As the separator, there was used a porous membrane (37 mm long×27 mm wide and 0.1 mm thick) made of a hydrophilized polyvinylidene fluoride (Durapore membrane filter manufactured by Milipore Corporation).

(Fabrication of Cathode)

A cathode catalyst layer was constructed from acetylene black as a conductive material, electrolytic $MnO_2$ as a catalyst for promoting the reduction of oxygen and a PTFE powder as a binder. The weight ratio was set at acetylene black:electrolytic $MnO_2$:PTFE=10:10:1, and this was mixed in an agate mortar to obtain a mixed powder. This mixed powder was directly pressure-bonded to a collector to form the cathode catalyst layer of 35 mm long×25 mm wide and 0.3 mm thick. As the collector, a collector for discharge made of a stainless mesh (35 mm long×25 mm wide×0.1 mm thick) was used. A nickel ribbon terminal for external connection (50 mm long×3 mm wide×0.20 mm thick) was connected to an end part of this collector.

(Fabrication of Electrode Laminate)

The anode, the separator and the cathode that had been fabricated as mentioned above were made one set and were laminated as illustrated in FIG. 5(a), to obtain a structure 500. Four sets of the structures 500 were laminated so that neighboring sets of the anodes 53 and the cathodes 51 come into contact with each other, to fabricate a structure (an electrode group) 501 of FIG. 5(b).

This electrode group 501 was accommodated in the container package member 30 in the procedure illustrated in FIGS. 6(a) to (b). A lead wire 54a of the cathode 51 and a lead wire 54b of the anode 53 were welded to a lead wire 54a draw section of the cathode 51 and a lead wire 54b draw section of the anode 53 in a lid part of the container package member, respectively. Then, the container package member 30 was sealed as illustrated in FIG.6(c). A main body part and a lid part of the container package member 30 were also sealed with Araldite (epoxy resin type adhesive).

(Fabrication of Air Battery 1)

The tank 3 in which the electrolytic solution was stored, the pump 4, the oxygen intake 2 and the main body 5 were connected using the pipe arrangement 6 so that the circulation would be in this order, and an air battery 1, as illustrated in FIG. 1, was fabricated. A tube made of polypropylene was used as the pipe arrangement for connection.

(Fabrication of Air Battery 110)

Figure 11:
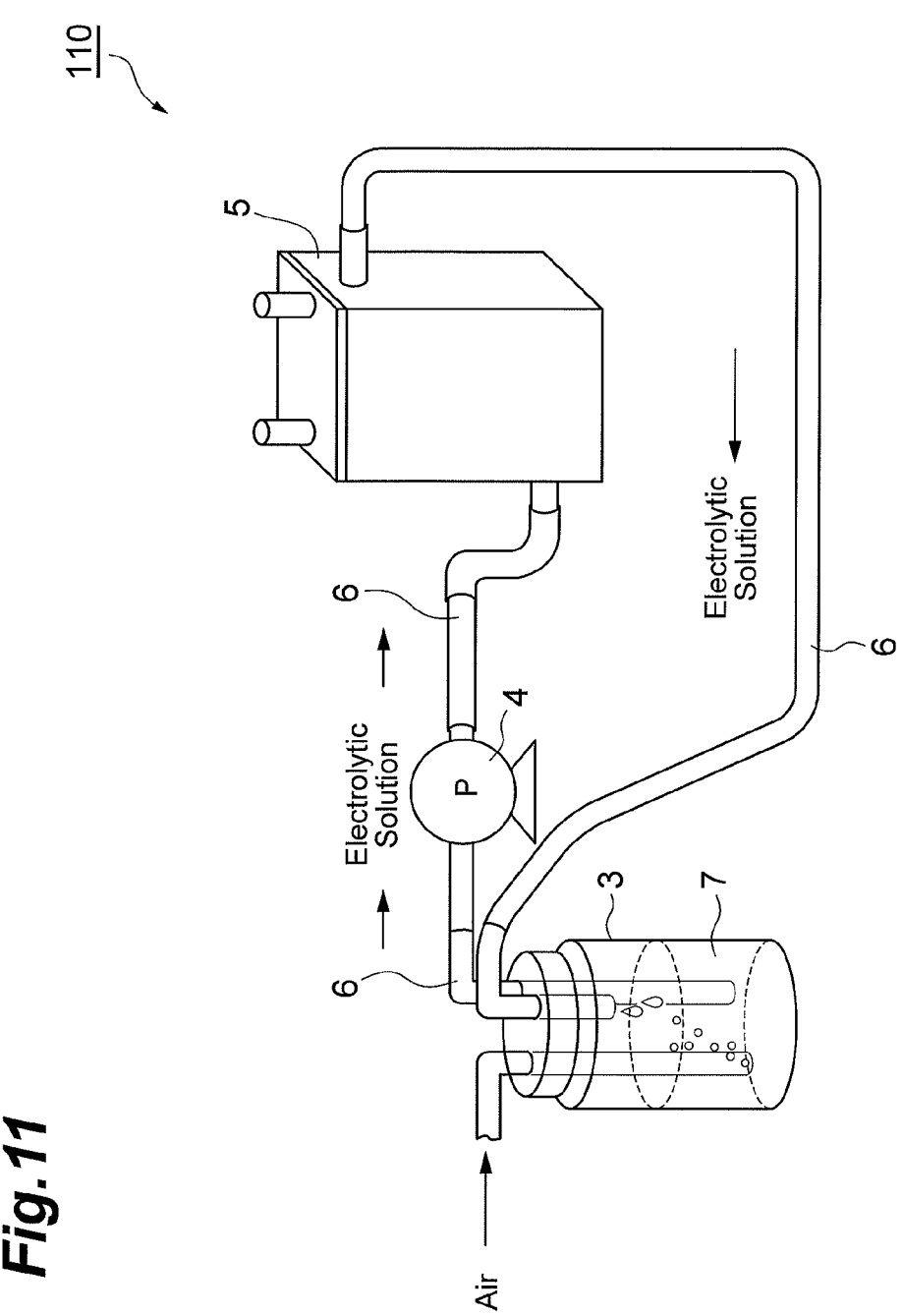
FIG. 11 is a schematic view of an air battery of a Comparative Example.

The tank 3 in which the electrolytic solution was stored, the pump 4 and the main body 5 were connected using the pipe arrangement 6 so that the circulation would be in this order, and an air battery 110, as illustrated in FIG. 11, was fabricated. A tube made of polypropylene was used as the pipe arrangement for connection.

(Evaluation of Air Battery Performance)
(Discharge Test)

The air battery 1 or 2 fabricated as described above was connected to a charge/discharge tester (product name TOSCAT-3000U manufactured by Toyo System Co., Ltd); the constant current discharge at 5 $mA/cm^2$ (CC discharge) was carried out against aluminum of the anode and cut off was done at an end voltage of 0.5 V.

Example 1

The above-mentioned discharge test was carried out using the air battery 1 of FIG. 1. As a result, the discharge capacity was 510 mAh. The average discharge voltage was 1.25 V.

Comparative Example 1

The above-mentioned discharge test was carried out by using the air battery 110 of FIG. 11 and bubbling air from a diffuser into the tank 3 in which the electrolytic solution was stored. As a result, the discharge capacity was 400 mAh. The average voltage was 1.20 V.

Comparative Example 2

The above-mentioned discharge test was carried out by using an air battery 110 the construction of which was similar to that in Comparative Example 1 and by substituting a 99.9% nitrogen gas for the gas to be bubbled into the tank 3 in which the electrolytic solution was stored. As a result, discharging was impossible (a capacity of 0 mAh).

The air batteries after discharging that had been used in Example 1, Comparative Example 1 and Comparative Example 2 were disassembled and their cathode catalyst surfaces were analyzed. Consequently, a white-like precipitate was confirmed on the surface of the cathode catalyst of Comparative Example 1. This was recovered and analyzed to confirm the presence of potassium carbonate, and it became evident that poisoning had occurred. On the other hand, no white-like ones were confirmed on the surfaces of the cathode catalysts of Example 1 and Comparative Example 2.

Thus, by supplying an electrolytic solution with the air that was allowed to pass through an oxygen selective permeable membrane which was excellent both in oxygen permeability and in selectivity for oxygen permeation relative to carbon dioxide permeation, the problem of poisoning by carbon dioxide could be solved, which was the technical problem of batteries using electrolytic solutions of the circulation type.

REFERENCE SIGNS LIST

1: Air battery, 2: Oxygen intake, 3: Tank, 4: Pump, 5: Main body, 6: Pipe arrangement, 7: Electrolytic solution, 10,20: Oxygen selective permeable membrane, 21: Elastic plate having openings, 22a,22b: Stainless plate, 23a,23b: Nozzle, 23: Through-hole, 24: Through-hole, 25: Opening, 30: Container package member, 51: Cathode, 52: Separator, 53: Anode, 54a,54b: Lead, 200: Main body part, 500,501: Structure.

The invention claimed is:
1. An air battery comprising:
a main body including a container package member, an electrolytic solution contained in the container package member, a cathode having a cathode catalyst that is in contact with the electrolytic solution, and an anode that is in contact with the electrolytic solution;
a tank storing the electrolytic solution;

a pump circulating the electrolytic solution between the main body and the tank;

an oxygen intake incorporating oxygen into the electrolytic solution in the way of circulation of the electrolytic solution; and a pipe arrangement connecting the tank, the pump, the oxygen intake and the main body so that the electrolytic solution circulates in the order thus named, wherein the oxygen intake has an oxygen selective permeable membrane and wherein an oxygen permeability coefficient ($P_{O2}$) of the oxygen selective permeable membrane is $400 \times 10^{-10}$ $cm^3 \cdot cm/cm^2 \cdot s \cdot cm$ Hg or greater; and wherein a contact angle of the electrolytic solution against a surface of the oxygen selective permeable membrane is 90° or greater.

2. The air battery according to claim 1, wherein a contact angle of the electrolytic solution against a surface of the oxygen selective permeable membrane is 150° or greater.

3. The air battery according to claim 1, wherein a ratio ($P_{O2}/P_{CO2}$) of an oxygen permeability coefficient ($P_{O2}$) to a carbon dioxide permeability coefficient ($P_{CO2}$) for the oxygen selective permeable membrane is 0.15 or greater.

4. The air battery according to claim 1, wherein the anode is at least one metal selected from the group consisting of lithium, sodium, magnesium, aluminum, potassium, calcium, zinc, iron and a hydrogen-absorbing alloy.

5. The air battery according to claim 1, wherein the electrolytic solution is a solution comprising an electrolyte and water, and the electrolyte is at least one kind selected from the group consisting of KOH, NaOH, LiOH, $Ba(OH)_2$ and $Mg(OH)_2$.

6. The air battery according to claim 1, wherein the cathode catalyst comprises manganese dioxide or platinum.

7. The air battery according to claim 1, wherein the cathode catalyst comprises a perovskite-type mixed oxide represented by $ABO_3$, the $ABO_3$ comprises at least two atoms selected from the group consisting of La, Sr and Ca at the A site, and at least one atom selected from the group consisting of Mn, Fe, Cr and Co at the B site.

* * * * *